(12) United States Patent
Höfer

(10) Patent No.: US 7,010,000 B1
(45) Date of Patent: Mar. 7, 2006

(54) METHOD AND APPARATUS OF DETERMINING PROPERTIES OF A SIGNAL TRANSMISSION CHANNEL

(75) Inventor: Gerald Höfer, Schwabmühlhausen (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/831,478

(22) PCT Filed: Nov. 2, 1999

(86) PCT No.: PCT/EP99/08361

§ 371 (c)(1),
(2), (4) Date: Aug. 29, 2001

(87) PCT Pub. No.: WO00/30310

PCT Pub. Date: May 25, 2000

(30) Foreign Application Priority Data

Nov. 10, 1998 (EP) .................................. 98121134

(51) Int. Cl.
*H04J 3/12* (2006.01)
(52) U.S. Cl. ..................... 370/470; 370/514; 370/523
(58) Field of Classification Search ................ 370/470, 370/506, 507, 509, 514, 522, 523; 375/229, 375/231, 233, 245
See application file for complete search history.

(56) References Cited

U.S. PATENT DOCUMENTS

| | | | |
|---|---|---|---|
| 5,267,300 A | 11/1993 | Kao et al. | ................. 379/93.07 |
| 5,793,809 A | 8/1998 | Holmquist | ................... 375/242 |
| 5,822,328 A * | 10/1998 | Derby et al. | ................. 370/507 |
| 5,825,823 A | 10/1998 | Goldstein et al. | ........... 375/286 |
| 6,178,185 B1 * | 1/2001 | Marks | ......................... 370/514 |
| 6,414,989 B1 * | 7/2002 | Olafsson et al. | ............ 375/229 |
| 6,574,280 B1 * | 6/2003 | Liau et al. | ................... 375/242 |
| 6,600,780 B1 * | 7/2003 | Wang et al. | ................. 375/233 |

FOREIGN PATENT DOCUMENTS

| | | |
|---|---|---|
| EP | 0 735 717 A2 | 10/1996 |
| EP | 0833 481 A1 | 4/1998 |
| EP | 0 871 303 A2 | 10/1998 |
| EP | 0 735 717 A3 | 4/1999 |

(Continued)

OTHER PUBLICATIONS

Anonymous, "Improvement to Spectral Shaping Technique," IBM Technical Disclosure Bulleting, vol. 41, No. 415, Nov. 1, 1998, XP0021000049, NY, USA, 2 pages.

(Continued)

*Primary Examiner*—John Pezzlo
*Assistant Examiner*—Saba Tsegaye
(74) *Attorney, Agent, or Firm*—Fish & Richardson P.C.

(57) ABSTRACT

The invention generally relates to a modem connected via a digital interface to a switched public telephone network and to a method for probing the line properties. The modem communicates with a second modem also connected via a digital interface to the same switched public telephone network. The public telephone network may incorporate voice compression devices (ADPCM G.726, G.723 etc.), digital pads (digital attenuators), robbed bit signalling and echo cancelling devices. The probing sequence of the invention uses large amplitude changes in a symbol sequence (each symbol having a duration of 125 $\mu$s). After that single amplitude change, the signal may return to the previous value or continue with the new amplitude value for a number of symbols. The number of symbols is selected to be larger than any expected impulse response of a digital impairment of the channel. The amplitude value change must be large enough to produce a sufficient result in the presence of digital pads with or without the presence of RBS.

13 Claims, 3 Drawing Sheets

FOREIGN PATENT DOCUMENTS

| | | |
|---|---|---|
| EP | 0 871 303 A3 | 10/1999 |
| WO | WO 98/13979 | 4/1998 |
| WO | WO 98/17044 | 4/1998 |
| WO | WO 98/37657 | 8/1998 |
| WO | WO 98/39866 | 9/1998 |
| WO | WO 99/12267 | 3/1999 |

OTHER PUBLICATIONS

ITU-T Recommendation, V. 34, "Data Communication Over the Telephone Network," Sep. 1994, XP002100826, Geneva, p. 41, paragraph 11.2-p. 49, paragraph 11.4.

\* cited by examiner

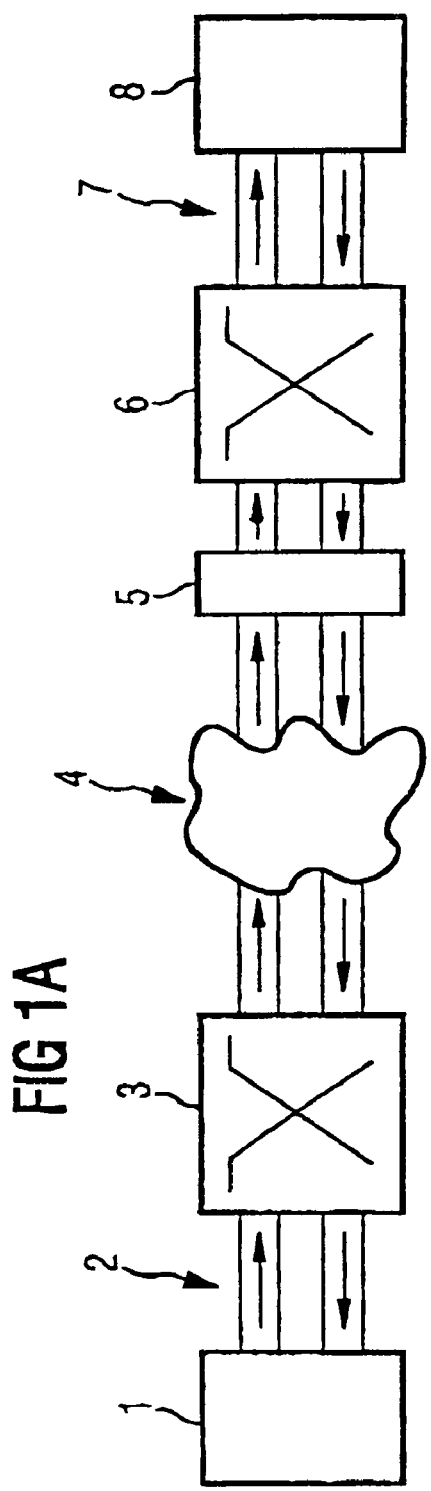
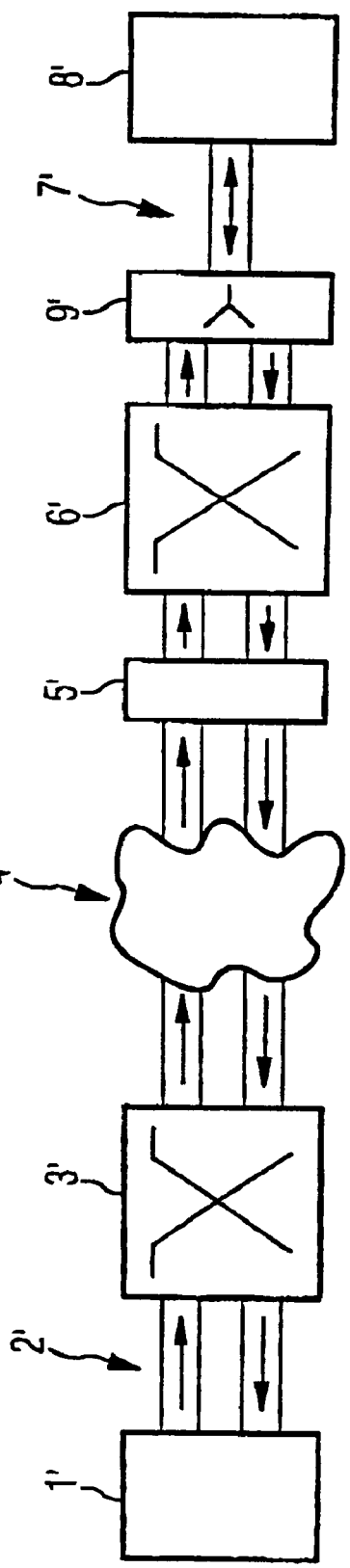
FIG 1A
FIG 1B

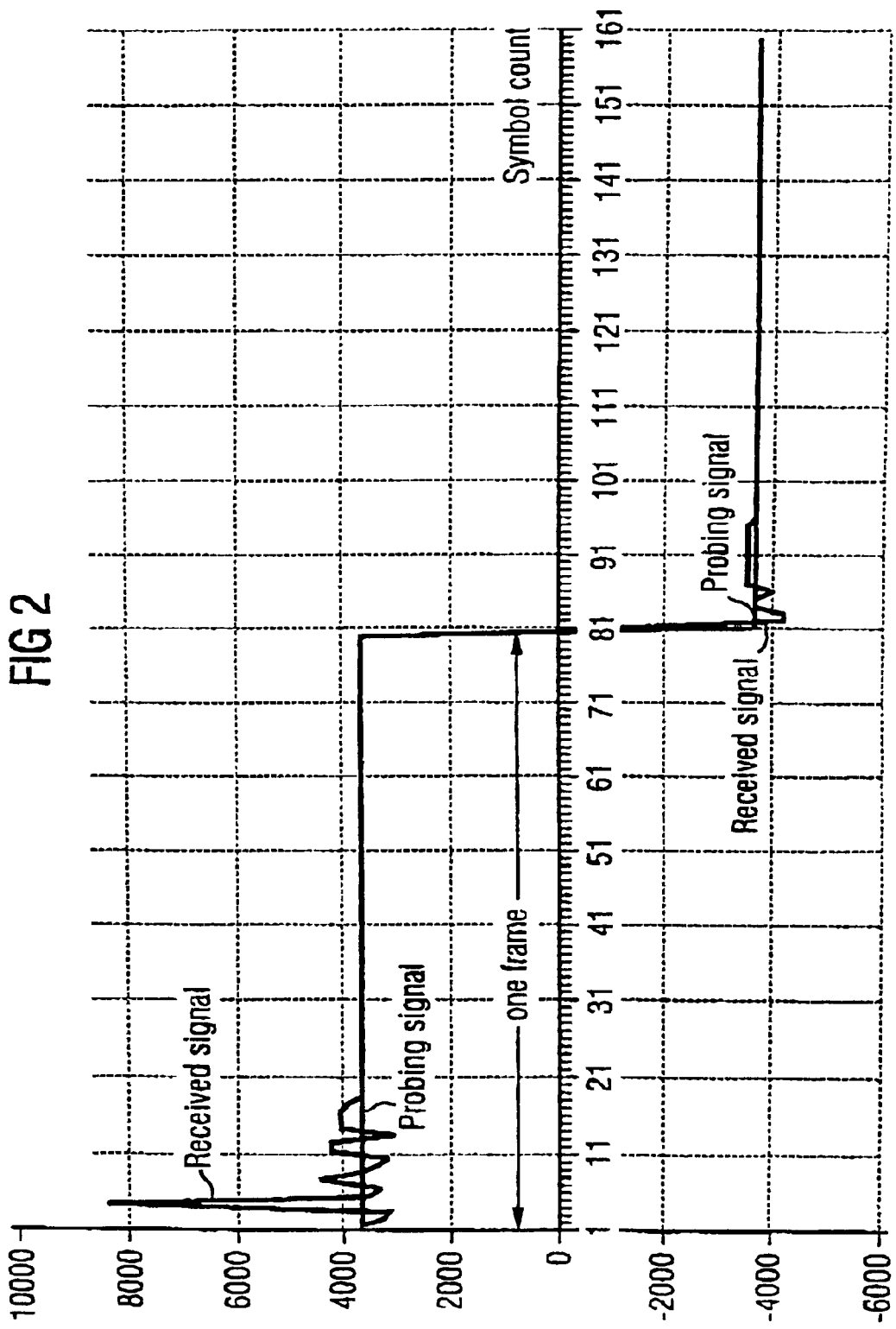

METHOD AND APPARATUS OF DETERMINING PROPERTIES OF A SIGNAL TRANSMISSION CHANNEL

The invention relates to a method of determining properties of a signal transmission channel between a first subscriber end point and a second subscriber end point of a telephone network having a plurality of subscribers, wherein a first subscriber terminal is connected to said first subscriber end point and a second subscriber terminal is connected to said second subscriber end point, wherein said telephone network upon request of a subscriber establishes a signal transmission channel between said first subscriber and said second subscriber, wherein said first subscriber end point is connected to the telephone network by a digital channel portion. The invention further relates to a subscriber terminal in a telephone network having a plurality of subscribers, wherein said telephone network upon request of a subscriber establishes a signal transmission channel between selected subscribers, said subscriber terminal being connected to a subscriber end point of said telephone network.

Recently, substantial progress has been made in increasing the data transmission rates when transmitting data over conventional analogue telephone lines. The International Telecommunications Union (ITU) has promulgated and published various recommendations, such as V.32, V.32bis, or V.34, that are concerned with data transmission over telephone lines. These recommendations are all based on a transmission technique called quadrature amplitude modulation (QAM). QAM has proven advantageous for the plain old telephone system (POTS) environment.

Nevertheless, the network of telephone system has undergone massive changes in that the network is nowadays almost entirely digital. The analogue signals originating from a first subscriber modem are converted at the subscriber's central office to digital representations which are carried through the digital telephone network. At the central office of a second subscriber, the digital signals are converted back into analogue signals to be driven into a second subscriber's subscriber line. The second subscriber's modem interprets the analogue signals on the analogue subscriber line by demodulating the QAM signals produced by the first subscriber's modem. The same way of data communication is carried out in the reverse direction.

Increasingly more subscribers are connected to the telephone network through a digital subscriber interface, such as ISDN. Thus, many data connections are established between a first subscriber having an analogue network interface and a second subscriber having a digital network interface. In many cases, the second subscriber will be an internet service provider. In order to optimise data transmission over such heterogeneous communication channels, various proposals have been made in the recent past. One such proposal is known from U.S. Pat. No. 5,801,695.

The proposal is based on the idea that the transmission rate in a heterogeneous communication channel from the digital subscriber to the analogue subscriber may be raised by using a PCM coding technique instead of the former QAM modulation techniques. The PCM coding technique uses a plurality of signal levels for encoding data symbols (each data symbol comprising multiple bits). These signal levels are again recognised by the receiving modem which is then able to decode the data symbol encoded into the signal levels.

Further, ITU has promulgated a new recommendation V.90 in Sep. 1998. The new recommendation also relies on a PCM coding technique for the transmission of data from the digital subscriber to the analogue subscriber. Draft recommendation V.90 in terms of its PCM coding scheme depends on ITU-T recommendation G.711 describing Pulse Code Modulation (PCM) of Voice Frequencies which is generally applied in telephone networks throughout the world when converting analogue signal amplitude values into numeric representations thereof, and vice versa. G.711 recommends two PCM coding schemes generally known as µ-law, which is applied in North American telephone networks, and A-law, which is applied inmost other telephone networks. Both coding schemes have in common that they have a logarithmic coding characteristic, i.e. the lower the signal amplitude value to be encoded, the more fine-grain the available PCM codes. Such logarithmic coding characteristic has been found to be particularly advantageous for encoding analogue voice signals at minimum distortion.

Recommendation G.711 makes available 256 PCM codes (or U-codes as called in V.90) which are grouped into eight positive and eight negative segments (or U-chords as called in V.90). Each PCM code is encoded using eight bits. Due to power restrictions on the analogue telephone line and due to line impairments, the analogue modem (according to the terminology used in the draft to V.90) receiving analogue amplitude values is unable to discriminate between all 256 available PCM codes. Therefore, a reduced set of PCM codes is determined for encoding data symbols during set-up of a data communication channel under real world conditions. This accordingly lowers the data transmission rate down from the maximum theoretical possible value of 64 kbit/s such that it is not above 56 kbit/s.

ITU-T Recommendation V.90 assumes an environment where one subscriber terminal of a connection is connected to the telephone network through a digital line and the other subscriber terminal of the connection is connected to the telephone network through an analogue line. However, in many instances, both subscriber terminals of a connection are connected to the telephone network through a digital connection. This situation would allow to establish an all-digital channel between the two subscriber terminals at a data rate of 64 kbit/s, which is the standard data rate in telephone networks.

U.S. Pat. No. 5,515,398 discloses modem line probing signal techniques. These probing techniques relate to former analogue line modems defined for example in ITU-T V.34.

It is an object of the invention to provide a line probing scheme in order to detect an all-digital connection path between subscriber terminals of a telephone network.

A method of determining properties of a signal transmission channel in a telephone network that connects a first subscriber end point to a second subscriber endpoint by a signal transmission channel having a digital channel portion is disclosed. The method can include sending a digital probing signal from a first subscriber terminal to a second subscriber terminal. The method can also include receiving, at the second subscriber terminal, a received signal resulting from having transmitted the digital probing signal through the signal transmission channel and comparing the received signal with the digital probing signal to distinguish between possible channel configurations of the signal transmission channel. The method can also include transmitting a response signal from the second subscriber terminal to the first subscriber terminal.

A first embodiment of the invention pertains to a method of determining properties of a signal transmission channel between a first subscriber end point and a second subscriber end point of a telephone network having a plurality of subscribers. A first subscriber terminal is connected to said first subscriber end point and a second subscriber terminal is connected to said second subscriber end point. Said telephone network upon request of a subscriber establishes a signal transmission channel between said first subscriber and said second subscriber. Said first subscriber end point is connected to the telephone network by a digital channel portion. In a first step, said first subscriber terminal sends to said second subscriber terminal a digital probing signal comprising a sequence of frames, each frame comprising a sequence of digital symbols, each symbol having a plurality of bits. The digital values of all symbols over all frames are equal except for one bit position of each symbol, the value of which changes with every other frame. Said second subscriber terminal then receives a signal which is the result of said digital probing signal having been transmitted through said signal transmission channel. Said second subscriber terminal evaluates said received signal by comparing said received signal with said digital probing signal. Eventually, said second subscriber terminal transmitting a response signal to said first subscriber terminal, said response signal carrying information about the comparison result.

A second embodiment of the invention also concerns a method of determining properties of a signal transmission channel between a first subscriber end point and a second subscriber end point of a telephone network having a plurality of subscribers. This method alternatively provides that said first subscriber terminal sends to said second subscriber terminal a digital probing signal comprising a sequence of frames, each frame comprising a sequence of digital symbols, each symbol having a plurality of bits, wherein the digital values of all symbols are equal except for at least one pulse symbol of each frame having a significantly different digital value compared to the remaining equal values.

The line probing schemes proposed by the invention allow both to find out whether an all-digital transmission channel is present between said first subscriber end point and said second subscriber end point and further to find out the transmission properties of the all-digital transmission channel. Since the transmission channels of most telephone networks are primarily intended for voice signal transmission, some networks impose digital signal impairments upon the digital signals carried through the network's channels. Such digital impairments include digital padding (digital signal attenuation), robbed bit signalling, ADPCM (Advanced Differential Pulse Code Modulation) coding and voice compression algorithms. The latter impairments allow to reduce the bit rate of 64 kbit/s generally reserved for a full channel to a lower rate without much sacrifice to the quality of voice signal transmission, thus making available bandwidth for other purposes. The methods of the invention are capable of discriminating whether an all-digital channel is present and whether or not the all-digital channel has digital impairments. The methods of the invention are even capable of discriminating what kind of digital impairment is present in an all-digital transmission channel. Knowing the kind of digital impairment allows the conclusion as to whether a transmission scheme between said first subscriber terminal and said second subscriber terminal is possible according to V.90 or another lower rate scheme such as V.34.

In the first embodiment, it is preferred that said one bit position is the most significant bit position. This way, the absolute digital value difference from one frame to another is as large as possible. It is even further preferred that said one bit position is the position of the sign bit. This way of line probing ensures that no direct current is produced in an analogue channel portion which may be present in the transmission channel to be probed.

In the second embodiment, it is preferred that one bit position of said at least one pulse symbol changes value with every other frame. Thus, frames can be identified as such more easily by the second subscriber terminal. In an even more preferred embodiment, said one bit position is the position of the sign bit. This ensures that no direct current is produced in an analogue channel portion which may be present in the transmission channel to be probed.

In the second embodiment, it is preferred that the number of equal symbols per frame is significantly higher than the number of pulse symbols. This allows said second subscriber terminal to clearly identify a pulse symbol as such. Preferably, there is one pulse symbol per frame.

Alternatively, there may be two pulse symbols per frame. It is most preferred that the total number of symbols per frame is 80.

Further advantages, features and areas of using the invention are explained in the following description of a preferred embodiment of the invention which is to be read in conjunction with the attached drawings. In the drawings:

FIG. 1a shows the configuration of an all-digital signal transmission path in the presence of digital impairment;

FIG. 1b shows the configuration of a signal transmission path having an analogue portion;

FIG. 2 is a signal diagram of a probing signal and a received signal according to a first embodiment of the invention;

FIG. 3 depicts a digital symbol sequence of a probing signal and various received signals according to a second embodiment of the invention.

FIG. 1a illustrates an all-digital signal transmission path between a first subscriber terminal 1 and a second subscriber terminal 8. The first subscriber terminal 1 (a digital modem) is connected through a digital line portion 2 to a local digital switch 3. The local switch 3 is connected to a digital transmission network 4 which forwards digital signals between subscribers of the transmission network. On the other end of the all-digital signal path, the second subscriber terminal 8 is connected through a digital line portion 7 to a local digital switch 6. The local switch 6 is connected to the transmission network 4 through a digital impairment device 5. FIG. 1a shows an exemplary position of the digital impairment device within the transmission path. The digital impairment device may as well be part of any of the digital switches 3 and 6 or may be part of the transmission network 4 or of the transmission path 7.

Digital impairments include digital padding (digital signal attenuation), robbed bit signalling (RBS), and ADPCM (Advanced Differential Pulse Code Modulation) coding or other voice compression algorithms which may be imposed upon the signals passing through the impairment device 5. Digital impairment devices are present in many existing transmission networks and have to be accounted for when trying to establish a connection between subscriber terminals of the network at the highest bit rate possible.

FIG. 1b shows a similar configuration as FIG. 1a except that the second subscriber terminal 8' is connected to the transmission network through an analogue line portion 7'. The transmission path of FIG. 1a consequently includes a hybrid device 9' which is connected to the analogue line portion 7' and performs a four-wire to two-wire conversion. Additionally, the hybrid device 9' performs, on the four-wire side, a digital-to-analogue and an analogue-to-digital signal conversion so as to be connected to a digital switch 6'. The remaining structure of FIG. 1b corresponds to the one shown in FIG. 1a. Thus, the description of the remaining elements may be referred to by similar reference numerals.

Both FIG. 1a and FIG. 1b illustrate exemplary structures of transmission paths that may be encountered when trying to establish a connection between two subscribers of a transmission network wherein at least one of the two subscribers is connected to the network through a digital line portion such as ISDN. Depending on the structure encountered on the transmission path between the subscribers, they may agree upon a certain transmission scheme allowing a bit rate as high as possible for the encountered structure. Known transmission schemes are ITU-T V.34 using quadrature amplitude modulation on analogue transmission paths and ITU-T V.90 using pulse amplitude modulation on transmission paths having both analogue and digital line portions. Further, pulse amplitude modulation according to ITU-T V.90 can also be used as a transmission scheme on all-digital transmission paths.

FIG. 2 is a diagram of a probing signal of the first embodiment of the invention. The probing signal is transmitted by the first subscriber terminal 1. FIG. 2 also shows a signal received by the second subscriber terminal 8 in the presence of a digital impairment device 5 introducing ADPCM to the signal transmission path between the first subscriber and the second subscriber. Terminal 1 sends 80 digital symbols of equal value in a first frame and then sends 80 digital symbols of the same absolute value, however, being negative in sign. The probing signal consists of a plurality of frame pairs as illustrated in FIG. 2 subsequently transmitted by the first terminal 1.

In the presence of ADPCM in the transmission path, the received signal does not precisely follow the large signal swings from one frame to another. The second terminal 8 may interpret this as an all-digital transmission path which is not transparent due to ADPCM. Such a connection is not capable of carrying an ITU-T V.90 transmission scheme.

FIG. 3 shows a digital symbol sequence of a probing signal (sequence a) transmitted by the first subscriber terminal 1 (Modem 1) according to a second embodiment of the invention and various cases of received signals (sequences b through f). FIG. 3 shows a frame structure of . . .

Sequence (b) of FIG. 2 shows the signal received by subscriber terminal 8 (Modem 2) in the case of an all-digital, fully transparent connection. Thus, the frame sent by modem 1 is received by modem 2 with identical symbols, merely displaced in time. This case allows to establish a PCM transmission scheme between modem 1 and modem 2. Sequences (b) though (f) show received signals in the presence . . .

Sequence (d; shows a received signal in the presence of digital impairment in the form of robbed bit signalling (RBS). RBS is applied to a least significant bit of every sixth symbol. Thus, the received signal differs from the original probing sequence every sixth symbol. Sequence (e) shows a received signal in the presence of both digital padding and RBS. Thus, the effects of both impairments appear as a superimposed effect on the received signal.

Finally, sequence (f) shows a received signal under the influence of ADPCM or another voice compression algorithm. The ADPCM coder cannot follow the high pulse symbol 4Ch of the probing sequence interspersed in the zero symbols 00h. Thus, the pulse symbol of modem 1 is received with a much wider pulse width and less high amplitude in modem 2. This is a clear indication of ADPCM.

The invention generally also relates to a modem connected via a digital interface to a switched public telephone network. The modem communicates with a second modem also connected via a digital interface to the same switched public telephone network. Thus, there may exist the possibility to set up a connection between both modems with a transmission rate of 64 kbit/s on the basis of coding voice signals with pulse code modulation according to ITU-T recommendation G.711. The public telephone network may incorporate voice compression devices (ADPCM G.726, G.723 etc.), digital pads (digital attenuators), robbed bit signalling and echo cancelling devices.

Under such circumstances, digital encoding schemes like pulse amplitude modulation according to ITU-T V. 90 instead of known analogue schemes like ITU-T V.34 may be utilised to transfer data. In order to apply such a digital coding scheme, it needs to be assured that an all-digital channel has been established between the modems. Assuring this may be carried out by an appropriate probing signal sent through the transmission channel. Known probing techniques have proven that they cannot discriminate all possible channel configurations.

The probing sequence of the invention uses large amplitude changes in a symbol sequence (each symbol having a duration of 125 $\mu$s). The meaning of amplitude relates to the definition of ITU-T recommendation G.711. After that single amplitude change, the signal may return to the previous value or continue with the new amplitude value for a number of symbols. The number of symbols is selected to be larger than any expected impulse response of a digital impairment of the channel. The amplitude value change mast be large enough to produce a sufficient result in the presence of digital pads with or without the presence of RBS.

The receiving modem will evaluate the received symbols and search for amplitude changes. If these changes occur only for one symbol per frame and the following symbols either return to the previous value or remain at the new value, the connection is detected as capable of carrying, a V.90 transmission scheme. If, however, the symbols after an amplitude change do not remain at the new value or do not return to the value before the change (in other words there is an impulse response over time), it is determined that a connection according to ITU-T V.90 is not possible. Typical impairments having an impulse response are voice compression algorithms and ADPCM, which may also be regarded as a compression algorithm. Whereas ADPCM has a characteristic impulse response to a change in amplitude, it depends on the design of a voice compression algorithm how large amplitude swings are processed and coded into the output signal of the voice compression coder.

Robbed bit signalling changes the least significant bit (LSB) in some symbols but leaves the remaining seven bits unchanged. A single amplitude change will therefore only be affected in the LSB, the remaining seven bits, however, will not change. Digital pads use conversion functions which defines an output value to a PCM input value thus providing digital attenuation. This function will only change the absolut value of the amplitude but it will not affect the behaviour of the signal over time.

In an implementation, modem 1 will generate a pattern as described in conjunction with FIG. 3 and sends the pattern through the transmission channel to modem 2. Modem 2 will receive a pattern which differs from the transmit pattern due to network impairments. Modem 2 will evaluate the pattern in the following way: It will first logical AND the pattern with FEh in order to ignore changes in the LSB. Next it will compare this new value with the previous one. If they are identical, a counter is incremented. If they are different, then the current count value is compared to the expected value and if they differ, an error counter is incremented. Then the counter is reset to zero and the new value is transferred to the old value register. When all symbols have been evaluated, the value of the error counter is compared to a fixed threshold value. If the error counter value is below the threshold, then it is determined that the connection is not capable of carrying an ITU-T V.90 type transmission scheme.

The appended program codes show how line probing signals according to the invention may be produced. The programs are based on a pseudo code. The program of appendix A corresponds to the embodiment of FIG. 2, and the program of appendix B corresponds to the embodiment of FIG. 3. By no means are these programs a limitation of the invention.

APPENDIX A

```
Example of program code for alternating pattern:
Transmit_Pattern:
Loop_COUNT = 20
High_Code = 4CH
Low_Code = CCH
Total_count = 100
For (i; I=0; I=Total_count)
    {
    For (j;J=1; j=Loop_Count)
        SendPCMvalue (Low_code);
    For (j;J=i;j=Loop_Count)
        Ser.dPCMvalue(High_Code);
    }
Receiver:
Loop_Count = 20
Total_count = 100 * 2 * Loop_Count
Old = 0;
Error = 0;
Count = 0;
For (i;i=0;i=Total_count)
    {
    a = (GetnewPCMvalue( ) && 11111110B)      ;Masked LSB
for RRS impact
    If (Old < > a)
            count++
    ELSE
            IF (COUNT < > LOOP_COUNT-1)
                    Error++
            count = 0
    Old = a;
    }
If (Error > 1)
    Return (False)
Return (True)
```

APPENDIX B

```
Example code for single value pattern detection:
Transmit_Pattern:
Loop_COUNT = 20
High_Code = 4CH
Low_Code = 00H
Total_count = 100
For (i;I=0;I=Total_count)
    {
    For (j;J=1; j=Loop_Count-1)
        SendPCMvalue (Low_code);
    SendPCMvalue High_Code);
    For (j;J=1; j=Loop_Count-1
        SendPCMvalue (Low_code);
    SendPCMvalue(High_Code EXOR 80H):
    }
Receiver:
Loop_Count = 20
Total_count = 100 * (LoopCount)
Old = 0;
Error = 0;
Count = 0;
```

APPENDIX B-continued

```
For (i;i=0;i=Total_count)
    {
    a = (GetnewPCMvalue( ) && 11111110B)      ;Masked LSB
for RBS impact
    If (Old < > a)
            count++
    ELSE
    {
        IF (COUNT < > LOOP_COUNT-2)
            IF (COUNT < > 0)
                Error++
        Count = 0
    Old = a;
    }
If (Error > 1)
    Return (False)
Return (True)
```

What is claimed is:

1. In a telephone network connecting a first subscriber end point to a second subscriber end point by a signal transmission channel having a digital channel portion, a method of determining properties of said signal transmission channel, said method comprising:

sending a digital probing signal from a first subscriber terminal connected to said first subscriber end point to a second subscriber terminal, connected to said second subscriber end point, said digital probing signal having a sequence of probing frames, each probing frame having at least two frame portions, each frame portion having the same preset number of digital symbols, each digital symbol having one sign bit and one data bit, wherein absolute digital values of all symbols in the frame portions are equal, and wherein a value of the sign bit changes with every adjacent frame portion, receiving, at said second subscriber terminal, a received signal resulting from having transmitted said digital probing signal through said signal transmission channel;

comparing said received signal with said digital probing signal to distinguish between possible channel configurations of said signal transmission channel; and transmitting a response signal from said second subscriber terminal to said first subscriber terminal, said response signal carrying information indicative of a result of comparing said received signal with said digital probing signal.

2. The method according to claim 1, wherein sending a digital probing signal comprises setting all data bits of each symbol of a probing frame to have the same logical value.

3. The method according to claim 1, wherein sending a digital probing signal comprises setting the total number of symbols of a probing frame to be greater than the number of symbols in an impulse response of a digital impairment of the signal transmission channel.

4. The method according to claim 3, wherein setting the total number of symbols of a probing frame further comprises selecting the total number of symbols per probing frame to be 80.

5. A subscriber terminal connected to a subscriber end point of a telephone network having a plurality of subscribers, said subscriber terminal comprising:

a connection between said subscriber terminal and a subscriber end point, said subscriber end point being connected to the telephone network by a digital channel portion, and a probing signal transmitter for sending, to a second subscriber terminal to which a signal transmission channel has been established, a digital probing signal having a sequence of probing frames, each probing frame having at least two frame portions, each frame portion having the same preset number of digital symbols, each digital symbol having one sign bit and one data bit, wherein absolute digital values of all symbols in the frame portions are equal, and wherein the value of the sign bit changes with every adjacent frame portion.

6. The subscriber terminal of claim 5, wherein one bit position of said digital symbol changes value with every other frame.

7. The subscriber terminal of claim 6, wherein said one bit position is the position of the sign bit.

8. The subscriber terminal of claim 5, wherein the number of equal symbols per frame is higher than the number of digital symbols.

9. The subscriber terminal of claim 5, wherein there is one digital symbol per frame.

10. The subscriber terminal of claim 5, wherein there are two digital symbols per frame.

11. The subscriber terminal of claim 5, wherein the total number of symbols per frame is 80.

12. A telephone network comprising:
a connection between a subscriber end point of said telephone network and a first subscriber terminal, said subscriber end point being connected to the telephone network by a digital channel portion, and
a probing signal transmitter for sending, to a second subscriber terminal to which a signal transmission channel has been established, a digital probing signal having a sequence of frames, each frame having a sequence of digital symbols, the sequence including the same preset number of digital symbols, each symbol having one sign bit and one data bit, wherein digital values of all symbols over all frames are equal except for one bit position of each symbol, the value of which changes with every other frame.

13. A telephone network comprising:
a connection between a subscriber end point of said telephone network and a first subscriber terminal, said subscriber end point being connected to the telephone network by a digital channel portion,
a probing signal transmitter for sending, to said second subscriber terminal, a digital probing signal having a sequence of frames, each frame having a sequence of digital symbols, the sequence including the same preset number of digital symbols, each symbol having a one sign bit and one data bit, wherein digital values of all symbols are equal except for at least one symbol of each frame having a different digital value compared to the remaining equal values.

* * * * *